United States Patent
Skiba et al.

(10) Patent No.: US 9,432,325 B2
(45) Date of Patent: Aug. 30, 2016

(54) AUTOMATIC NEGATIVE QUESTION HANDLING

(71) Applicant: Avaya Inc., Basking Ridge, NJ (US)

(72) Inventors: David Skiba, Golden, CO (US); George W. Erhart, Loveland, CO (US); Lee Becker, Boulder, CO (US); Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 229 days.

(21) Appl. No.: 14/020,674

(22) Filed: Sep. 6, 2013

(65) Prior Publication Data

US 2014/0297764 A1    Oct. 2, 2014

Related U.S. Application Data

(60) Provisional application No. 61/809,737, filed on Apr. 8, 2013.

(51) Int. Cl.
   *G06F 15/16*   (2006.01)
   *H04L 12/58*   (2006.01)
   *A47L 13/20*   (2006.01)

(52) U.S. Cl.
   CPC ............ *H04L 51/32* (2013.01); *A47L 13/20* (2013.01)

(58) Field of Classification Search
   CPC ....................................................... H04L 51/32
   USPC ........................................................ 709/206
   See application file for complete search history.

(56) References Cited

U.S. PATENT DOCUMENTS

| | | |
|---|---|---|
| 6,879,668 B2 | 4/2005 | Neuwald et al. |
| 7,903,801 B1 | 3/2011 | Ruckart |
| 7,912,720 B1 | 3/2011 | Hakkani-Tur et al. |
| 7,983,910 B2 | 7/2011 | Subramanian et al. |
| 7,996,210 B2 | 8/2011 | Godbole et al. |
| 8,010,539 B2 | 8/2011 | Blair-Goldensohn et al. |
| 8,111,813 B2 | 2/2012 | Weber et al. |
| 8,352,405 B2 | 1/2013 | Fang et al. |
| 8,463,594 B2 | 6/2013 | Au |
| 8,463,606 B2 | 6/2013 | Scott et al. |
| 8,700,480 B1 | 4/2014 | Fox et al. |
| 8,838,633 B2 | 9/2014 | Dhillon et al. |
| 8,972,379 B1 | 3/2015 | Grieselhuber et al. |
| 2005/0125216 A1 | 6/2005 | Chitrapura et al. |
| 2007/0064882 A1 | 3/2007 | Ger et al. |
| 2009/0306967 A1 | 12/2009 | Nicolov et al. |
| 2009/0319342 A1 | 12/2009 | Shilman et al. |
| 2010/0050117 A1 | 2/2010 | Sherrard et al. |

(Continued)

OTHER PUBLICATIONS

U.S. Appl. No. 13/594,283, filed Aug. 24, 2012, entitled: Real Time Statistics for Contact Center Mood Analysis Method and Apparatus.

(Continued)

*Primary Examiner* — Ario Etienne
*Assistant Examiner* — Sahera Halim
(74) *Attorney, Agent, or Firm* — Sheridan Ross P.C.

(57) ABSTRACT

A contact center system can receive messages from social media sites or centers. The system can review long messages by identifying content in the long message with negative sentiment. The content with negative sentiment is further analyzed to determine whether the identified content is actionable. If the identified content is actionable, the communication system can automatically routed the long message to an agent for response.

20 Claims, 8 Drawing Sheets

(56) References Cited

U.S. PATENT DOCUMENTS

| | | | |
|---|---|---|---|
| 2010/0119053 A1 | 5/2010 | Goeldi | |
| 2011/0002451 A1 | 1/2011 | Moran et al. | |
| 2011/0013756 A1 | 1/2011 | Davies et al. | |
| 2011/0078167 A1 | 3/2011 | Sundaresan et al. | |
| 2011/0191693 A1 | 8/2011 | Baggett | |
| 2011/0207437 A1 | 8/2011 | Richardson et al. | |
| 2012/0046938 A1 | 2/2012 | Godbole | |
| 2012/0143683 A1 | 6/2012 | Hertz et al. | |
| 2012/0245925 A1 | 9/2012 | Guha et al. | |
| 2012/0246104 A1 | 9/2012 | Di Sciullo et al. | |
| 2012/0259616 A1 | 10/2012 | Peng et al. | |
| 2012/0278064 A1 | 11/2012 | Leary et al. | |
| 2012/0296845 A1 | 11/2012 | Andrews et al. | |
| 2013/0046756 A1 | 2/2013 | Hao et al. | |
| 2013/0103386 A1 | 4/2013 | Zhang et al. | |
| 2013/0103623 A1 | 4/2013 | Burstein et al. | |
| 2013/0124191 A1 | 5/2013 | Louis et al. | |
| 2013/0173254 A1 | 7/2013 | Alemi | |
| 2013/0204613 A1 | 8/2013 | Godbole | |
| 2013/0218640 A1 | 8/2013 | Kidder et al. | |
| 2013/0231975 A1* | 9/2013 | High et al. | 705/7.29 |
| 2013/0311485 A1 | 11/2013 | Khan | |
| 2013/0325877 A1 | 12/2013 | Niazi | |
| 2014/0019118 A1* | 1/2014 | Tromp | 704/9 |
| 2014/0095148 A1 | 4/2014 | Berjikly et al. | |
| 2014/0180788 A1* | 6/2014 | George | G06Q 30/0269 705/14.41 |
| 2014/0189536 A1 | 7/2014 | Lange et al. | |
| 2014/0237057 A1* | 8/2014 | Khodorenko | 709/206 |
| 2014/0282934 A1 | 9/2014 | Miasnik et al. | |
| 2014/0304264 A1 | 10/2014 | Hailpern et al. | |
| 2014/0304343 A1 | 10/2014 | Skiba et al. | |
| 2014/0365213 A1 | 12/2014 | Totzke | |
| 2015/0106155 A1 | 4/2015 | Castellanos et al. | |

OTHER PUBLICATIONS

"Verint Extends Customer Interaction Analytics Portfolio with Addition of Sentiment and Text Analytics Software," Verint System Inc., Sep. 29, 2010, 3 pages [http://www.verint.com/news-events/press-releases/2010-pr-archives/09_29_2010. html].

Devillers et al. "Annotation and Detection of Emotion in a Task-oriented Human-Human Dialog Corpus," ISLE workshop, Dec. 2002, 10 pages.

Blair-Goldensohn et al., "Building a Sentiment Summarizer for Local Service Reviews," WWW Workshop on NLP in the Information Explosion Era, 2008, vol. 14, 10 pages.

Glance et al., "BlogPulse: Automated Trend Discovery for Weblogs," WWW Workshop on the Weblogging Ecosystem: Aggregation, Analysis and Dynamics, 2004, New York, 8 pages.

Neviarouskaya et al., "Textual Affect Sensing for Sociable and Expressive Online Communication," ACII 2007, LNCS 4738, 2007 Springer-Verlag, pp. 218-229.

Reyes et al., "A multidimensional approach for detecting irony in Twitter," Lang Resources & Evaluation, 2013, vol. 47, pp. 239-268.

Zhe et al., "Text-to-Emotion Engine for Real Time Internet Communication," Networks and DSPs, 2002, pp. 164-168.

Official Action for U.S. Appl. No. 13/594,283, mailed Dec. 3, 2015 21 pages.

Official Action for U.S. Appl. No. 14/020,674, mailed Dec. 3, 2015 22 pages.

Official Action for U.S. Appl. No. 14/024,334, mailed Nov. 10, 2015 17 pages.

U.S. Appl. No. 14/021,889, filed Sep. 9, 2013, Skiba.

U.S. Appl. No. 14/023,967, filed Sep. 11, 2013, Becker et al.

U.S. Appl. No. 14/024,334, filed Sep. 11, 2013, Skiba et al.

U.S. Appl. No. 14/146,527, filed Jan. 2, 2014, Mohler.

"Contact Center Text Analytics," Verint, Inc., 2012, 1 page [retrieved from: http://verint.com/contact_center/section2a.cfm?article_level2_category_id=21&article_level2a_id=345].

"Avaya Delivers Social Media Solutions to Drive Superior Customer Experiences," AVAYA, Jul. 2011, 1 page [retrieved from: http://www.avaya.com/usa/about-avaya/newsroom/news-releases/2011/pr-110712a].

Meng et al. "Cross-Lingual Mixture Model for Sentiment Classification," Proceedings of the 50th Annual Meeting of the Association for Computational Linguistics, Jeju, Republic of Korea, Jul. 8-14, 2012, pp. 572-581.

Official Action for U.S. Appl. No. 14/021,889, mailed Jan. 14, 2016 13 pages.

* cited by examiner

AUTOMATIC NEGATIVE QUESTION HANDLING

RELATED APPLICATIONS

This application claims priority to U.S. Provisional Application 61/809,737, filed Apr. 8, 2013, entitled "SENTIMENT FOR USE IN CONNECTION WITH CONTACT CENTER COMMUNICATIONS," which is incorporated herein by reference for all that it teaches and for all purposes.

BACKGROUND

Communication with customers and the importance of addressing customer concerns continues to grow in importance. Customers have more access to arenas to voice their concerns. Often, a dissatisfied customer can create a great amount of negative publicity by airing grievances through social media. The customer's message can be long and involved. Long messages tend to be harder to handle because of the density of the information and the inefficiencies with ferreting out specific negative comments.

In general, organizations need an efficient way to evaluate social media comments to address negative sentiment in the public forum.

SUMMARY

It is with respect to the above issues and other problems that the embodiments presented herein were contemplated. Embodiments presented herein provide a method for determining an agent routing in a contact center, the method comprises receiving, by a processor, a long social media message from a consumer; identifying content in the long social media message with negative sentiment; determining whether the identified content is actionable; and if the identified content is actionable, providing the long social media message to an agent for response.

An aspect of the above method includes wherein the long social media message includes two or more sentences, concepts, questions, statements, postings, segments, and/or interactions.

An aspect of the above method further comprises receiving two or more social media messages, wherein the long social media message is one of the two or more social media messages, and determining to review the long social media message from the two or more social media messages.

An aspect of the above method includes wherein negative sentiment is determined by one or more text processing techniques.

An aspect of the above method includes wherein actionable content is determined by one or more language processing techniques.

An aspect of the above method includes wherein one of the language processing techniques is object-focused analysis.

An aspect of the above method further comprises parsing the actionable content.

An aspect of the above method further comprises at least one of: sorting the parsed actionable content; or ordering the parsed actionable content.

An aspect of the above method includes wherein the actionable content is sorted or ordered based on one or more of a degree of negative sentiment, an information density, temporal information, or intent.

An aspect of the above method further comprises, based on a highest-ranked actionable content in the sort or the order, providing the long social media message to the agent.

Embodiments also include a computer readable medium having stored thereon processor executable instructions that cause a computing system to execute a method for generating an agent routing, the instructions comprising: instructions to receive, by a processor, a long social media message from a consumer; instructions to identify content in the long social media message with negative sentiment; instructions to determine whether the identified content is actionable; instructions to parse the actionable content; instructions to sort the parsed actionable content; instructions to order the sorted actionable content; and, based on the order, instructions to provide the long social media message to an agent for response.

An aspect of the above computer readable medium further comprises instructions to receive two or more social media messages, wherein the long social media message is one of the two or more social media messages; and instructions to determine to review the long social media message from the two or more social media messages. It should be noted that a long message can include one or more related postings (such as in Facebook™) with numerous comments that may be handled as a single long message.

An aspect of the above computer readable medium includes wherein negative sentiment is determined by one or more text processing techniques, and wherein actionable content is determined by one or more language processing techniques.

An aspect of the above computer readable medium includes wherein the actionable content is sorted or ordered based on one or more of a degree of negative sentiment, an information density, temporal information, or intent.

An aspect of the above computer readable medium includes wherein a routing decision to an agent is based on a highest-ranked actionable content in the order.

Embodiments also include a communication system comprising: a social media gateway in communication with a social media network, the social media gateway operable to receive a long social media message, from a customer, on the social media network; a dialog system in communication with the social media gateway, the dialog system operable to determine an agent routing for the long social media message, wherein the dialog system compromises: a text processing component that is operable to receive and analyze the long social media message, wherein the text processing component compromises: an negative sentiment analyzer operable to identify content in the long social media message with negative sentiment; an actionable text analyzer in communication with the negative sentiment analyzer, wherein the actionable text analyzer is operable to determine whether the identified content is actionable; a parser in communication with the actionable text analyzer, wherein the parser is operable to parse the actionable content; a sorter/order in communication with the parser, wherein the sorter/order is operable to one or more of sort or order the actionable content; and wherein, based on at least one of the sort or the order, the text processing component provides the long social media message to an agent interface to route the long social media message to an agent for response.

An aspect of the above communication system includes wherein the text processing component is further operable to: receive two or more social media messages, wherein the long social media message is one of the two or more social media messages; and determine to review the long social media message from the two or more social media messages.

An aspect of the above communication system includes wherein negative sentiment is determined by one or more text processing techniques, wherein actionable content is determined by one or more language processing techniques.

An aspect of the above communication system includes wherein the actionable content is sorted or ordered based on one or more of a degree of negative sentiment, an information density, temporal information, or intent.

An aspect of the above communication system includes wherein a routing decision to an agent is based on a highest-ranked actionable content in the order.

The proposed embodiments can determine sentiment and employ language analysis to find automatically negative questions for routing to an agent display, which saves agent time, provides improved customer service, and prevents confusion.

Empirical analysis of long messages on social media channels can indicate that the longer the message, the more likely it is to be a negative complaint and/or problem description of some kind (i.e., it is unlike that a person would write a 20,000 word text to praise a company for good service). Long postings often are presented in the form of a story monologue detailing some lengthy interaction between the customer and the company from the writer's point of view. These monologs may contain a historical timeline of interaction on multiple problems, of which previous problems may or may not be related to the current issue that stimulated the person the write (e.g., "The microphone on my Samsung S3 stopped working a month after I bought it. I took it back to the store and the sales guy swapped it for a new one. Everything was great after that, but now it is dropping the Internet connection whenever I am trying to use the browser."). As the example shows, the monologues may also contain positive and negative sentiment statements. The monologue might also include a long sequence of detailed actions that occurred before the writer felt compelled to write the monologue.

The system described herein can first search the incoming posts for sentences of negative sentiment and then can employ language analysis to eliminate words and/or phrases that are not communicating any useful information, questions, or intent (i.e., "I hate united!!!!!!!!!!!!!!" or "Delta sucks, sucks, sucks." is not useful). The method of analysis may include focusing on the object of the sentiment to determine if the object is specific enough to be acted upon. For example, "Hating Delta" does not provide detail on an issue, but hating the baggage fees is a problem upon which the company might be able to take action. This analysis may also require co-reference resolution to address statements like, "I hate you." Finally, the list of identified items can be analyzed and ranked according to negative sentiment, information density, temporal information, intent, etc. The most useful, recent, negative question or statement may then guide how to route and display the message for agent handling.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services. Examples of social media sites can include one or more of, but is not limited to, Facebook™, Twitter™, Pantip™, LinkedIn™, etc.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1A:
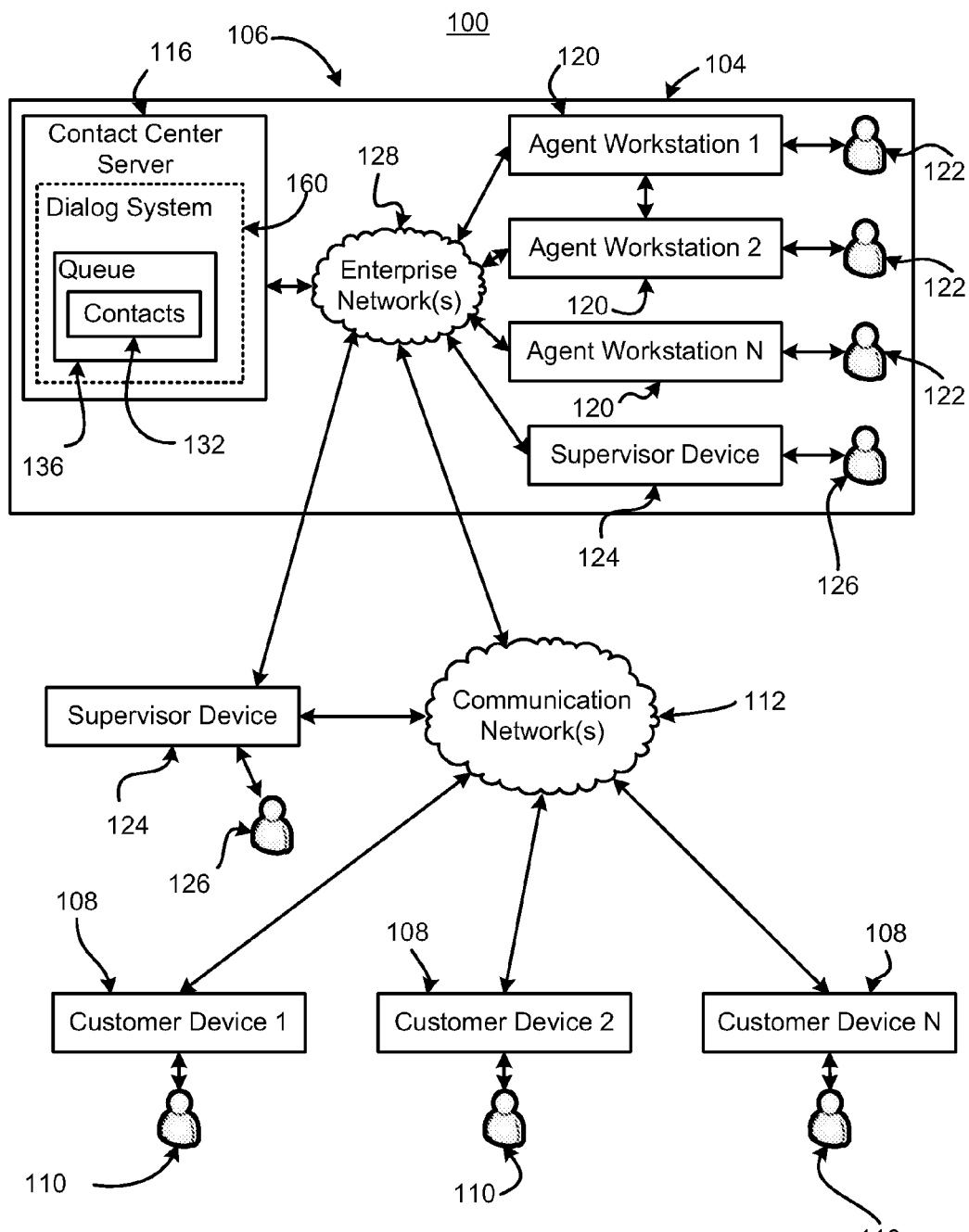
FIG. 1A is a block diagram of an embodiment of a communication system operable to interact with persons.

A block diagram depicting components of a communication system 100 is shown in FIG. 1A. In particular, the communication system 100 can include a contact center 104. In general, the contact center 104 can be in communication with one or more customer endpoints or devices 108 via one or more communication networks 112. Examples of customer endpoints 108 can include one or more of, but are not limited to, smartphones, desktop computers, laptop computers, or any other device capable of supporting communications between a customer and a customer service or other agent associated with the contact center 104 using written, oral, and/or electronic communications. Accordingly, communications between the contact center 104 and the customer endpoints 108 can comprise email, instant messaging, a telephone call, short message system, or other real time or non-real time communications. The communication network 112 can include the Internet, a local area network (LAN), wide area network (WAN), public switched telephone network (PSTN), wireless networks, or a plurality of networks in any combination.

The contact center 104 generally includes a call or contact center server 116, such as an automatic contact (or call) distribution system (ACD) server 116. The ACD server 116 is illustratively the Communication Manager™ enterprise communication-based ACD system available from Avaya Inc. The ACD server is interconnected to a plurality of agent workstations or endpoints 120. For example, the agent workstations 120 may be connected to the ACD server 116 by an enterprise network or networks 128.

The contact center server 116 generally functions to connect agent workstations 120 to customer devices or endpoints 108 through the communication network 112, to allow the agents 122 to service customer 110 contacts 132. The contacts can comprise written, electronic communications. However, contacts are not necessarily limited to written communications. For example, the contact center 106 can additionally handle voice contacts. As can be appreciated by one of skill in the art after consideration of the present disclosure, the contact center server 116 can maintain one or more queues 136 for organizing and maintaining or holding contacts 132 waiting for handling by a contact center agent 122. For example, a plurality of queues 136 can be provided to sort contacts according to various parameters. Agents 122 associated with the agent workstations 120 are assigned to provide services to contacts 132 that have been placed within one or more of the queues 136 based on availability and/or weighting factors. Moreover, the workstations 120, which can comprise general purpose computers, thin client devices, or other devices, generally support the delivery of customer contacts to associated agents 122, and to receive replies to the customer contacts from the agents 122. In addition, the agent workstations 120 can include a user output in the form of a display that can present a determined sentiment or sentiment indicator for a contact, or aggregation of contacts, to associated agents 122.

In addition, system 100, as described herein, can include one or more supervisor or administrator devices 124. The supervisor device 124 is generally in communication with the contact center server 116 via the communication network 112 and/or the enterprise network 128. For example, if the supervisor device 124 is on the premises of the contact center 104, communications with the contact center server 116 may be over a portion of the enterprise network 128 comprising a wired or wireless network. As another example, the supervisor device 124 may be in communication with the contact center server 116 over the communication network 112, for example via a cellular telephony data network, a wired or wireless connection outside of the enterprise network 128, or the like. In general, the supervisor device 124 comprises functionality that allows a supervisor 126 to monitor the health of the contact center 104, and to control aspects of the operation of the contact center 104. Moreover, the supervisor device 124 can present a sentiment indicator for a contact or aggregation of contacts to a supervisor 126. Accordingly, the supervisor device 124 can comprise any device, including a mobile device, capable of presenting information to a supervisor 126. Accordingly, examples of a supervisor device 124 include, but are not limited to, a tablet computer, a smartphone, a laptop computer, a desktop computer, a netbook, or the like.

Figure 1B:
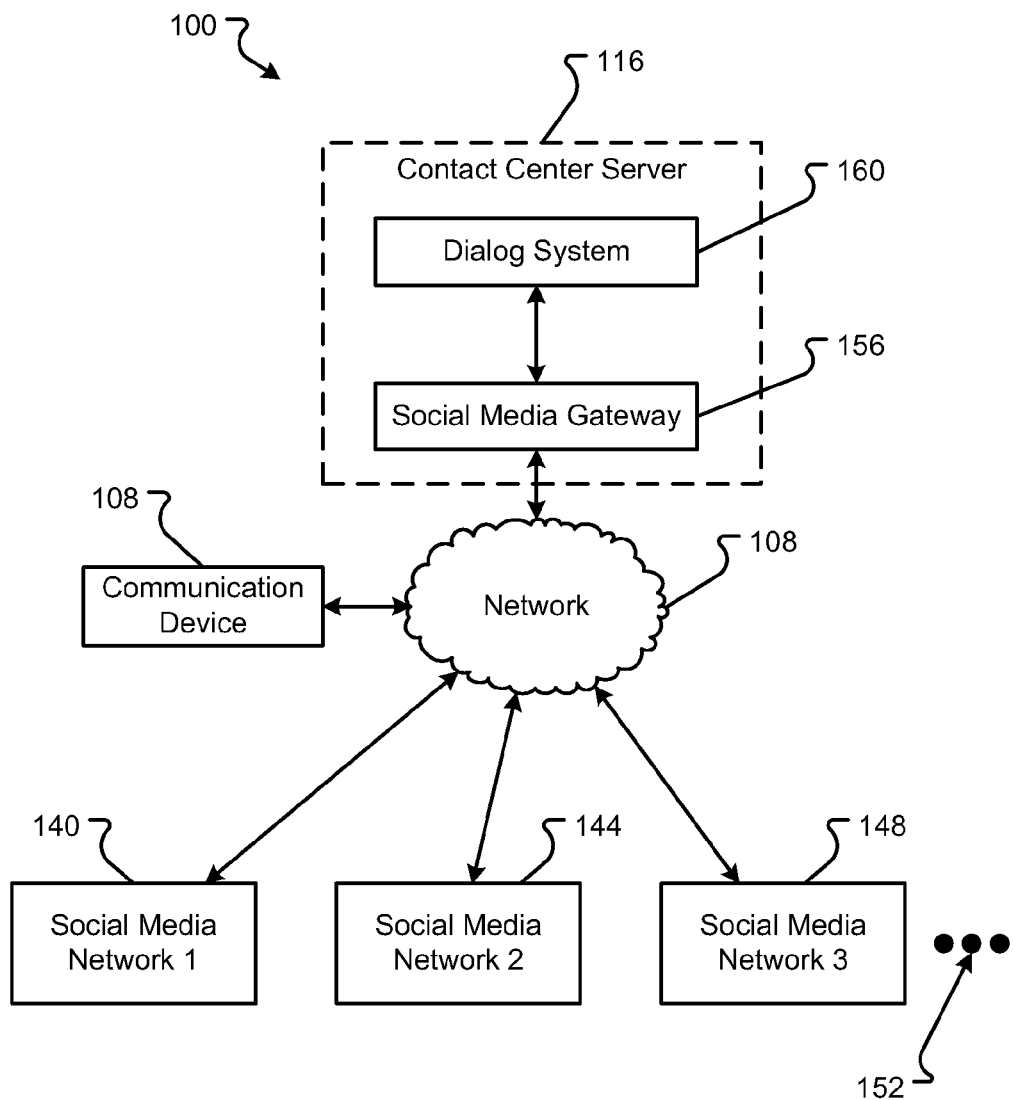
FIG. 1B is a block diagram of an embodiment of a communication system operable to interact with persons using a social media network.

A further embodiment of the communication system 100, for interacting with persons using social media, is shown in FIG. 1B. The communication system 100 can include a contact center 104, a network 128, 112, and one or more types of social media networks or systems, such as social media network 1 140, social media network 2 144, and/or social media network 3 148. Social media networks 140, 144, and/or 148 can be any social media including, but not limited to, networks, websites, or computer enabled systems. For example, a social media network may be MySpace™, Facebook™, Twitter™, Linked-In™, Spoke™, or other similar computer enabled systems or websites. The communication system 100 can communicate with more or fewer social media networks 140, 144, and/or 148 than those shown FIG. 1B, as represented by ellipses 152.

The network(s) 128, 112 can be any network, as described in conjunction with FIG. 1A, which allow communication between the contact center 116 and the one or more social media networks 140, 144, and/or 148. The network(s) 128, 112 can represent any communication system, whether wired or wireless, using any protocol and/or format. The network(s) 128, 112 provides communication capability for the contact center 116 to communicate with websites or systems corresponding to the one or more social media networks 140, 144, and/or 148. The network(s) 128, 112 may be as described in conjunction with FIGS. 5 and 6.

A contact center 116 can be a system that can communicate with one or more persons that use social media networking sites 112, 114, and/or 116. The contact center 116 can be hardware, software, or a combination of hardware and software. The contact center 116 can be executed by one or more servers or computer systems, as described in conjunction with FIGS. 5 and 6. The contact center 116 can include all systems, whether hardware or software, that allow the contact center 116 to receive, service, and respond to directed and non-directed contacts. For example, the contact center 116 can include the telephone or email system, an interface to human agents, systems to allow human agents to service and respond to received contacts, and one or more systems operable to analyze and improve the function of agent interaction.

The contact center 116 may include a dialog system 160 and a social media gateway 156. While the dialog system 160 and the social media gateway 156 are shown as being a part of the contact center system 116, in other situations, the dialog system 160 and/or the social media gateway 156 are separate systems or functions executed separately from the contact center 116 and/or executed by a third party. The dialog system 160 may process and receive messages. The social media gateway 156 can receive and translate messages from the one or more social media networks 140, 144, and/or 148. An embodiment of the dialog system 160 is described in conjunction with FIG. 2B. An embodiment of the social media gateway 156 is described in conjunction with FIG. 2A.

The contact center 116 may also communicate with one or more communication devices 108. The communication devices 108 can represent a customer's or user's cell phone, email system, personal digital assistant, laptop computer, or other device that allows the contact center 116 to interact with the customer. The contact center 116 can modify a non-direct contact, from a social media network 140, 144, and/or 148, into a directed contact by sending a response message directly to a customer's communication device 108.

Figure 2A:
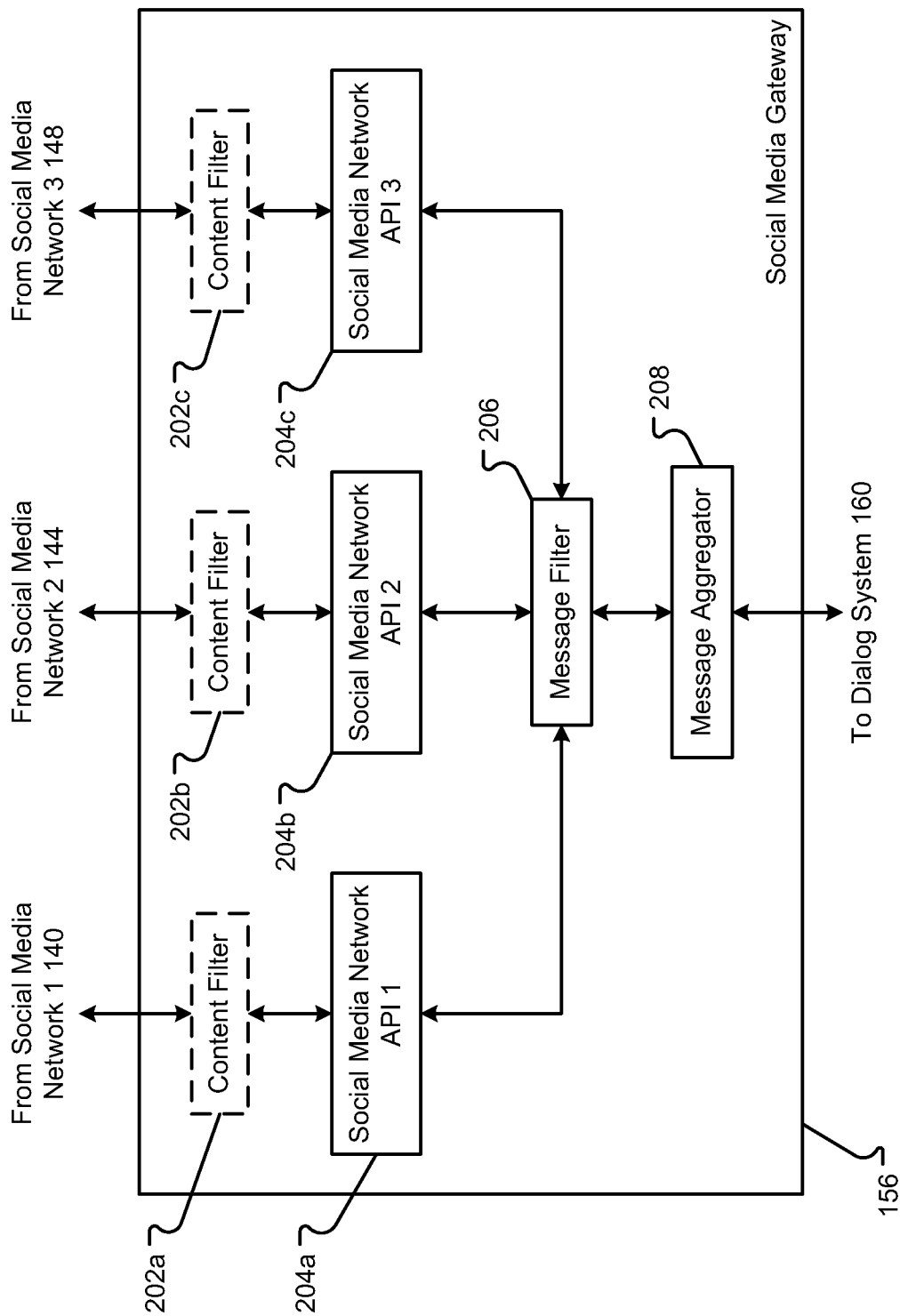
FIG. 2A is a block diagram of an embodiment of a social media gateway.

An embodiment of the social media gateway 156 is shown in FIG. 2A. The social media gateway 156 can include one or more components which may include hardware, software, or combination of hardware and software. The social media gateway 156 can be executed by a computer system, such as those described in conjunction with FIGS. 5 and 6. However, in other embodiments, the components described in conjunction with FIG. 2A are logic circuits or other specially-designed hardware that are embodied in a field programmable gate array (FPGA) application specific integrated circuit (ASIC), or other hardware.

Herein, the social media gateway 156 can include one or more content filters 202a, 202b, and/or 202c. A content filter 202 can receive all of the messages for the contact center 116 from a social media network 140, 144, and/or 148 and eliminate or delete those messages that do not require a response. For example, a message between two friends on a Facebook™ page, if not pertaining to a product or a service of the company operating the contact center 116, may not need a response. As such, the content filter 202 can filter out or delete the non-suitable message from the messages that are received by the social media network application programming interface (API) 1 204a, social media network API 2 204b, and/or social media network API 3 204c. With the content filter 202, the social media network API 204 only needs to translate those messages that should be received by the dialog system 160. Translation typically requires the conversion of the message into a different format.

The content filter 202 is provided with one or more heuristics or filter rules from a filter database (not shown). These filter rules can be created by the external customer or internal user (e.g. agent or administrator) of the communication system 100. Thus, the user or customer of the communication system 100 can customize the filtering of messages from social media networks 140, 144, and/or 148. Further, different rules may be applied to different social media networks 140, 144, and/or 148, as some social media networks 140, 144, and/or 148 may have different types of messages or postings than other types of social media networks 140, 144, and/or 148. While the content filter 202 is shown as part of the social media gateway 156, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 can be an application, which may be provided by the social media network 140, 144, and/or 148, to access the social media network(s) 140, 144, and/or 148. Thus, the social media network API 204 is called and connects the social media gateway 156 to the social media network 140, 144, and/or 148. Any suitable filter criteria may be employed for social media API 204. Examples of filter criteria include positive content of the source of a posting, an address field, a destination or recipient address fields, a time stamp field, a subject matter field, and/or a message body field. For example, a type of searchable content can be the name of the business enterprise running or employing the contact center 116 and/or the products or services of the enterprise.

The social media gateway 156 can include one or more social media network APIs 204. As shown in FIG. 2A, the social media gateway 156 may include a social media network API 204 for each social media network 140, 144, and/or 148. As such, the social media gateway 156 can interact with each social media network 140, 144, and/or 148 in the particular (often unique) format or protocol used by the social media network 140, 144, and/or 148. Further, when new social media networks are created, the social media gateway 156 can be easily expanded to interact with those social media networks by adding another social media network API 204. Where social media networks 140, 144, and/or 148 are more standardized, or use substantially similar formats or protocols, a single social media network API 204 can be shared by multiple social media networks 140, 144, and/or 148.

The social media network API 204 can receive messages from and send messages to the social media network 140, 144, and/or 148. The social media network API 204 can translate a message received from a social media network 140, 144, and/or 148 and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the dialog system 160. Further, the social media network API 204 can receive a generally or standard format response message, from the dialog system 160, and translate that response into a particularly or specifically formatted response message that can be posted to the corresponding social media network 140, 144, and/or 148.

Messages to the contact center 116 are addressed to the contact center 116. For example, a customer may become a "friend" of the contact center 116 on a social media network 140, 144, and/or 148, such as Facebook™. The customer may then address a message to the contact center 116 on Facebook™. This non-direct contact is a message that is not sent directly to the contact center 116 but to the contact center's Facebook™ page. In other circumstances, the contact center 116 receives messages not addressed to the contact center 116. For example, the contact center 116 can receive tweets from Twitter™ that are "broadcast" rather than addressed to the contact center 116. The contact center 116 may also search for messages or content on the social media networks 140, 144, and/or 148. Exemplary search criteria include customer name, customer profession, customer home address, customer business address, customer employer name, customer educational or professional background, customer hobby, personal or business interests, customer family profile, and the like. Thus, the social media gateway 156 of the contact center 116 can query, gather, or connect to a live feed of data from a social media network 140, 144, and/or 148 and then apply a filter to the indirect information.

Further, the social media network API 204 can also retrieve user context or other extended information from the social media networks 140, 144, and/or 148. User context or other extended information can include historical posts, historical tweets, or other historical communications that a user may have received or sent. Further, user context or other extended information can include, but is not limited to, account information for a user, the user's followers or friends, information on where historical messages were posted (e.g., geo-location, time/date, what type of device, etc.), trending analysis that the social media network 140, 144, and/or 148 might provide the user, etc. Thus, the social media network API 204 can retrieve information that is associated with a user and a social media network 140, 144, and/or 148 but not necessarily a part of a current message. The social media network API 204 is a gatherer of data, which can be used to determine a value for the user of the social media networks 140, 144, and/or 148.

The translated messages from the social media network API 204 can be received by a message filter 206. A message filter 206 can perform some or all of the functions of the content filter 202 and eliminate messages before being sent to the dialog system 160. However, in other situations, the message filter 206 eliminates information from within the messages before the redacted messages are sent to the dialog system 160. For example, a message from a social media network 140, 144, and/or 148 may have three or four interactions between two parties not associated with the contact center 116. Only one of the several postings may be pertinent to the dialog system 160. As such, the message filter 206 can eliminate or delete at least a portion of the other messages for the dialog system 160. Thus, the dialog system 160 receives a message where some of the content of the message has been deleted.

The message filter 206 can retrieve heuristics or filter rules from a filter database (not shown), similar to the content filter 202. A substantial difference between the content and message filters 202 and 206 is that the content filter 202 is specific to a particular message format associated with a corresponding social media network 140, 144, and/or 148, while the message filter 206 is applied to a standardized or universal format and is therefore common to multiple social media networks 140, 144, and/or 148. One skilled in the art will understand the type of rules that may be used to filter information from messages such that only pertinent questions, facts, requests, or information is sent to the dialog system 160.

A message aggregator 208 may also be included with the social media gateway 156. A message aggregator 208 can, in contrast to the message filter 206, combine two or more messages into a packet or grouping that is sent to the dialog system 160. Therefore, the message aggregator 208 can interrelate or combine messages based on information within the messages. For example, two messages may be combined based on any of the message fields referenced above, such as the person that posted the message, the subject, the request or question asked, the person the message was sent to, or other information that may be pertinent to the dialog system 160. Thus, the dialog system 160 may be able to respond concurrently to two or more messages based on a grouping provided by the message aggregator 208. Regardless of whether the messages are aggregated, each message or grouping of messages can be sent from the social media gateway 156 to the dialog system 160.

The social media gateway 156 can also send responses back to the social media networks 140, 144, and/or 148. A response from an agent in the contact center 116 can be sent to the social media gateway 156. The response may be received in a general format and then translated. The translated response may then be posted to the appropriate social media network 140, 144, and/or 148 by the social media gateway 156. In other embodiments, the agent may post the response directly to the social media network 140, 144, and/or 148 without sending the response to the social media gateway 156.

Figure 2B:
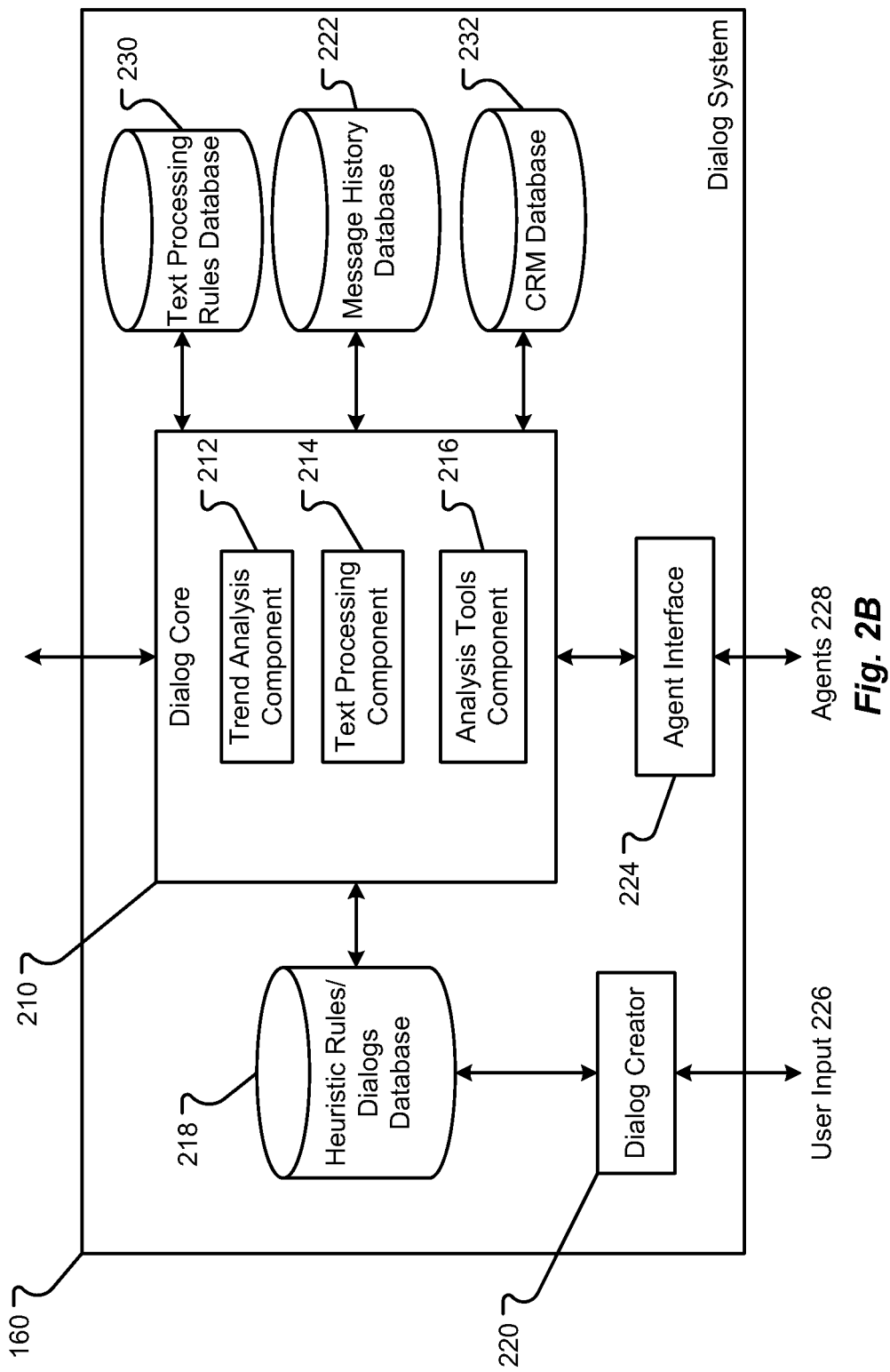
FIG. 2B is a block diagram of an embodiment of a dialog system.

An embodiment of the dialog system 160 is shown in FIG. 2B. The dialog system 160 can include one or more components which may be hardware, software, or a combination of hardware and software. The dialog system 160 can be executed by a computer system such as those described in conjunction with FIGS. 5 and 6. However, in other embodiments, the components described in conjunction with FIG. 2B, are logic circuits or other specially-designed hardware that are embodied in a FPGA or ASIC. The components contained within the dialog system 160 can include a dialog core 210 that is communication with a message history database 222, an agent interface 224, and a heuristic rules and dialogs database 218. Further, the heuristic rules and dialogs database 218 can be in communication with a dialog creator 220.

The dialog core 210 can include one or more subcomponents. For example, the dialog core 210 can include a trend analysis component 212, a text processing component 214, and an analysis tools component 216. These components, similar to the components for the dialog system 160, can be hardware, software, or combination of hardware and software. The dialog core 210 may step through the states of a dialog data structure. A dialog data structure can include a set of inputs and associated actions that can be taken which allow for the automatic and structured response to social media requests or messages. For example, if a user asks for a manual, the input of the text word "manual" can cause the dialog system 160, in accordance with a dialog data structure, to send information about one or more manuals. In turn, the receiver of the response may respond, in kind, with the selection of a certain user manual. In which case, the dialog data structure may then instruct the dialog core 210 to send the user to a website where the user can retrieve an electronic version of the manual. As such, the dialog data structure provides a script a dialog that allows the dialog core 210 to automate the interaction between the contact center 116 and a person. This automation eliminates the need for agent involvement, in some situations, and makes the contact center 116 more efficient and more effective. Further, the automation expands the contact center's ability to answer numerous messages from the plethora of postings on the numerous social media networks 140, 144, and/or 148.

The dialog creator 220 can create a dialog data structure that includes instructions for various states for each social media message that comes into the contact center 116. The first instruction might be to send the social media message to the trend analysis component 212, then to the text processing component 214, and then execute a query of a Customer Relationship Management (CRM) database 232 (to determine if this user has an existing order). A CRM database 232 can be a database as described in conjunction with FIGS. 5 and 6 and can store information about customers or other data related to customer relations. Finally, the dialog data structure 220 may decide that the social media message should be sent to a human agent 228 for processing. The instructions or node transitions are executed in the dialog core 210 and make use of many different components that the dialog creator 220 combines in any way the user desires to handle the social media messages. The dialog core 210 can make use of the trend analysis component 212, text processing component 214, or other systems. The dialog core 210 may also interface with a CRM system and/or database 232, external databases, social media user information (e.g., followers, friends, post history, etc. from the social media site), or other systems.

The trend analysis component 212 is operable to analyze trends that occur between two or more messages received by the social media networks 140, 144, and/or 148. The two messages can be from different social media network 140, 144, and/or 148, so that the trend analysis component 212 can identify trends across several different social media networks 140, 144, and/or 148. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 140, 144, and/or 148. For example, the trend analysis component 212 can match the number of occurrences of a phrase or word over a period of time and apply analysis to determine if the occurrences are increasing or decreasing over the period of time.

The text processing component 214 is operable to analyze text of one or more messages from social media networks 112, 114, or 116, from emails, from texts, from transcribed or oral phone calls, or other contacts. Some possible methods for text processing can include Regular Expression, Latent Semantic Indexing (LSI), text part of speech tagging, text clustering, N-Gram document analysis, etc. In addition, for possibly longer documents, (such as, blogs or emails), the text processing component 214 may execute one or more methods of document summarization. The summarization may occur if the social media message will be sent to an agent 228 of the contact center 116; the summarization can reduce the amount of information that the agent 228 may manage. The text processing rules or models may be stored in and/or retrieved from a text processing rules database 230. The text processing rules database 230 can be a database as described in conjunction with FIGS. 5 and 6 that stores rules or models used by the text processing component 214.

The text processing component 214 can identify one or more occurrences of a particular text, such as using one or more of the message fields referenced above, in order to associate that social media message with one or more dialogs data structures in the heuristic rules and dialog database 218. For example, the text processing component 214 can look for the word "manual," in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words, "buy", "sell", "price", "discount" or other types of words that may indicate the user or customer wishes to buy a product, the text processing component 214 can retrieve one or more dialog data structures from the heuristic rules and dialogs database 218 that can provide instruction to assist the customer in purchasing products or services from the enterprise.

The analysis tools component 216 is operable to analyze response messages received back from an agent interface 224. In analyzing the agent's responses, the analysis tools component 216 can determine if the dialog data structures originally retrieved by the text processing component 214 met the needs of the customer. In the analysis, the agent 228 may enter one or more items of information, for the analysis tools component 216, about the response and about how the response matched with the dialog data structures. The analysis tools component 216 can review the response and determine if it was similar to the response provided by the dialog data structure. Thus, the analysis tools component 216 can provide information to the dialog core 210 or the dialog creator 220 to improve the dialog data structures that are included in the heuristic rules and dialogs database 218.

Figure 5:
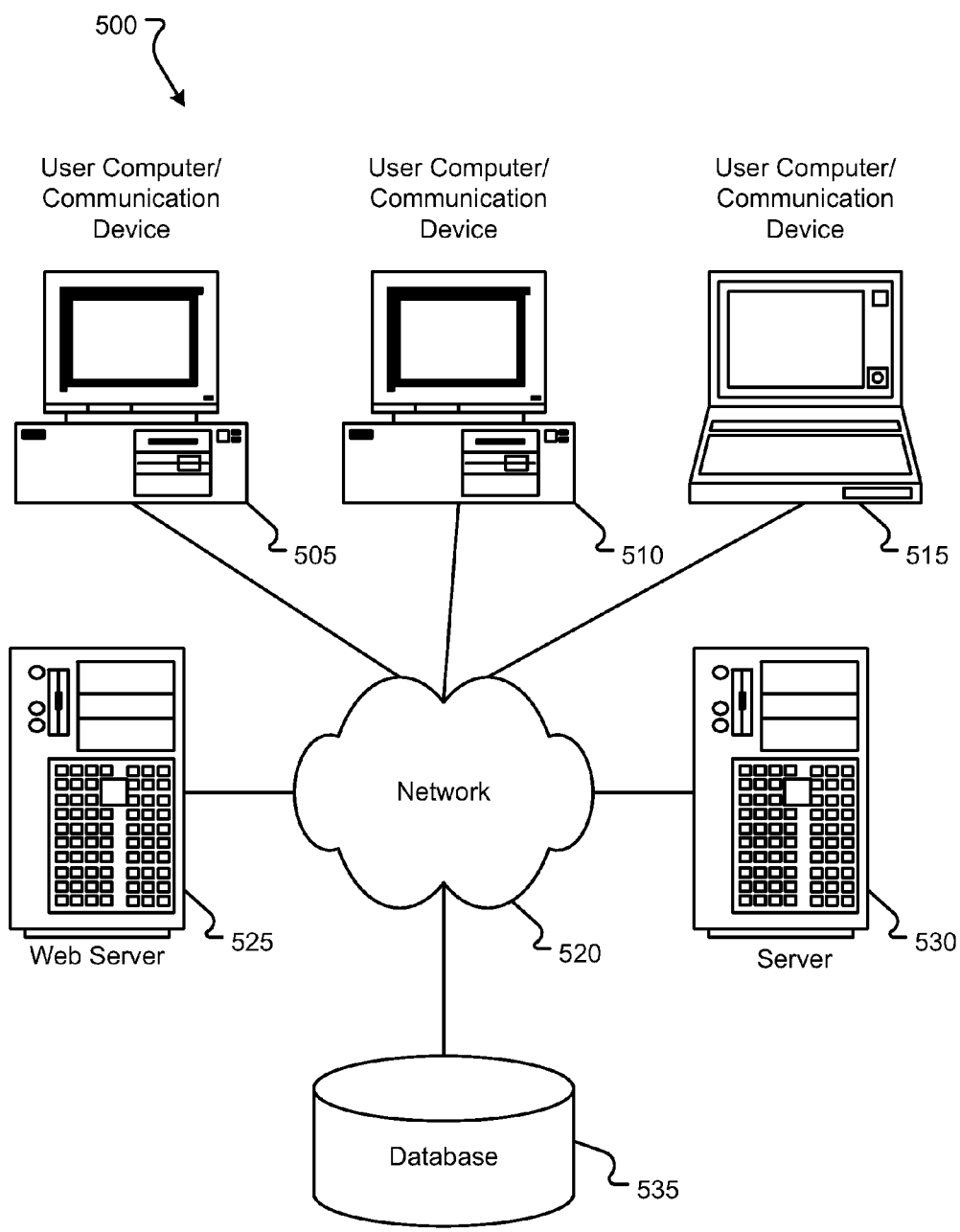
FIG. 5 is a block diagram of an embodiment of a computing environment.
Figure 6:
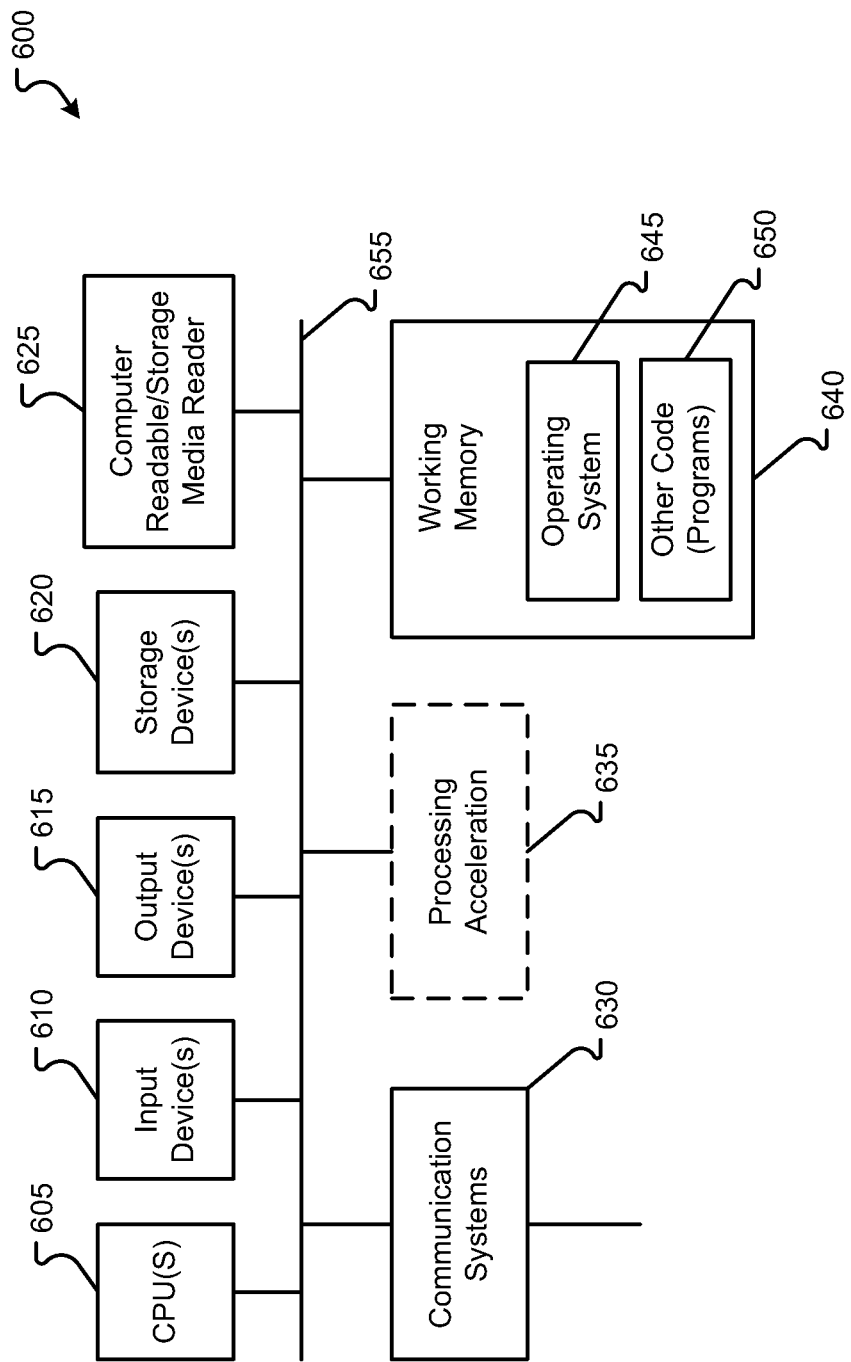
FIG. 6 is a block diagram of an embodiment of a computer system.

The message history database 222 can be any database or data storage system as described in conjunction with FIGS. 5 and 6. Thus, the message history database 222 can store data in data fields, objects, or other data structures to allow other systems to retrieve that information at a later time. The message history database 222 can store previous messages or information about previous messages. Thus, for example, if the trend analysis component 212 is analyzing several messages over a period of time, the trend analysis component 212 can retrieve information about previous messages associated with the current analysis from the message history database 222. As such, the trend analysis component 212 can better detect trends occurring at the social media networks 140, 144, and/or 148. The data stored by the message history database 222 can include the entire message or only a portion of the message, and in some circumstances, include metadata about the message(s).

The heuristic rules and dialogs database 218 can be any type of database or data storage system as described in conjunction with FIGS. 5 and 6. The heuristic rules and dialogs database 218 can store information in data fields, data objects, and/or any other data structures. The heuristic rules and dialogs database 218 stores rules and dialogs data structures that automate responses to received social media messages. The dialogs data structures control the interaction between the dialog core 210 and the social media network 140, 144, and/or 148. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center 116. An agent can be a person or other system that is operable to respond to certain questions or requests from a customer. For example, the agent 228 can be a person that has specialized expertise in a topic area, such as technical support. The agent interface 224 can format the social message into an action item and forward that message to one or more agents 228. The agent interface 224 can also receive response(s) back from the agents 228. The information provided by the agent 228 may be used by the dialog core 210 to complete a response to the social media message or other contact. For example, the information may classify the social media message (e.g., sales, service, etc.). In other situations, the response is a complete response to the social media message that can be posted to the social media network 140, 144, and/or 148. It should be noted that the answer based agent routing described hereinafter may be implemented in other types of call center or customer service centers other than that previously described. Thus, the answer based agent routing systems and methods described hereinafter are not limited to the social media call center described above.

Figure 3:
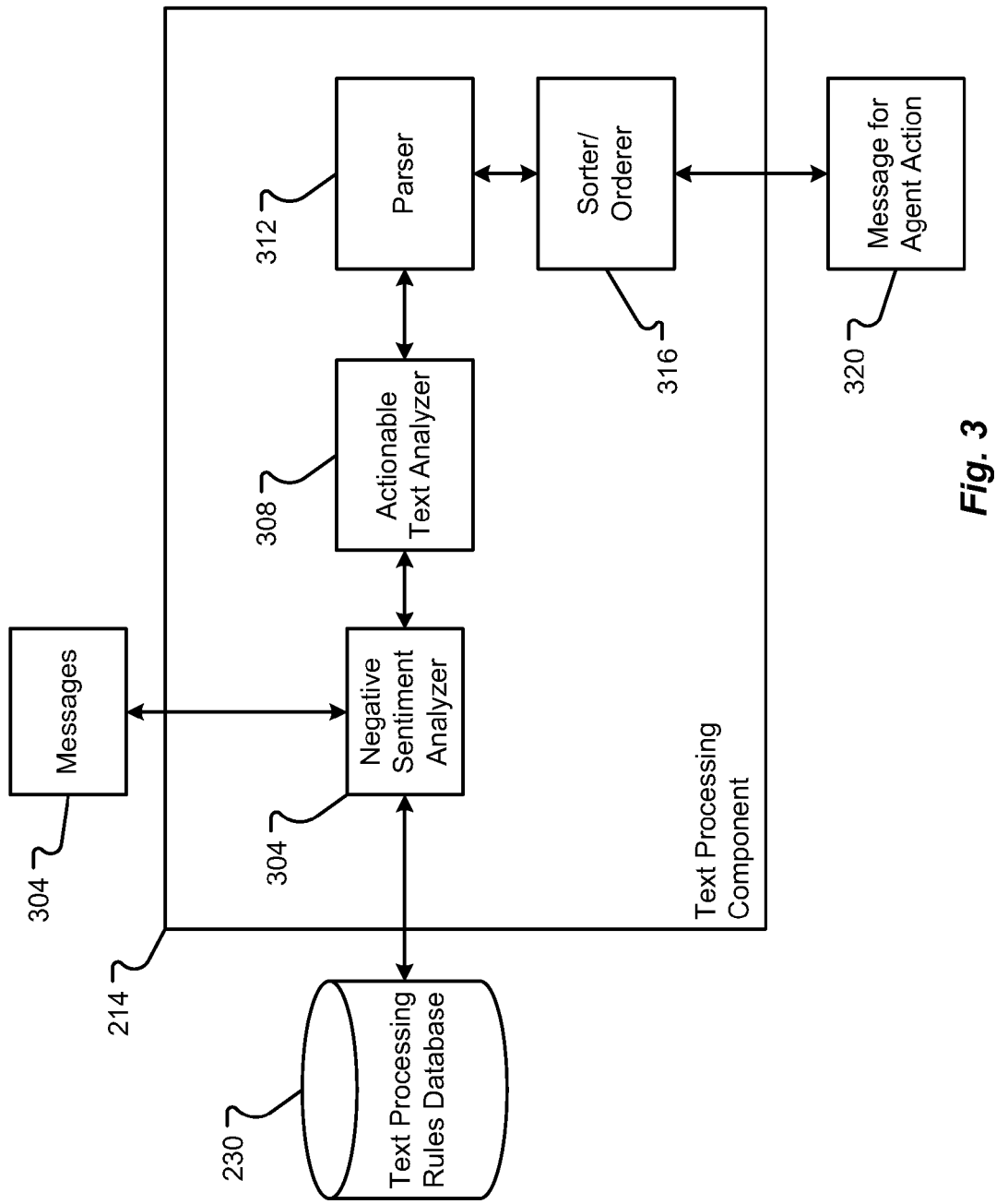
FIG. 3 is a block diagram of an embodiment of an text processing component.

An embodiment of the text processing component 214 is shown in FIG. 3. The text processing component 214 can be a module embodied either in hardware and/or software, and include one or more components, modules, or sub-modules. The text processing component 214 can include a negative sentiment analyzer 308, an actionable text analyzer 308, a parser 312, and/or a sorter/order 316. Each of these components can work in concert to receive messages 304 and access text processing rules database 230 to determine negative sentiment that can be acted upon by an agent. The output of the text processing component 214 may be a message 320 for agent action 320.

The negative sentiment analyzer 308 can receive messages 304. The messages may be long social media messages, long emails, long texts, long transcribed or oral phone calls, etc. For example, messages that have two or more sentences, concepts, questions, statements, postings, segments, and/or interactions with the text may be a long message. Further, a single posting in social media with two or more comments may be considered to be a long message and evaluated as a single message. The length of the message that designates the social media message as a long message is arbitrary and may be predetermined or set by a user. Thus, any number of lines, any number of characters of text, any portion of a page, etc. may be used to designate the message as a long social media message. The social media messages become more and more difficult to analyze as the messages become longer.

The negative sentiment analyzer 308 can identify content in the long social media message that has negative sentiment. The negative sentiment analyzer 308 can evaluate text within the content or message to determine if there are negative words or phrases therein. For example, the negative sentiment analyzer 308 can scan the message words such as "not", "fail", "awful", "disgusting", etc. These words may identify sentences that connote negative sentiment.

The negative sentiment analyzer 308 can retrieve the text processing rules from the text processing rules database 230. Here, the text processing rules database 230 can include information or algorithms used to identify negative sentiment. This information or algorithms can include any type of text processing or language analysis that could be used to identify sentences that may have a negative connotation. Sentences with negative sentiment may then be flagged and passed to the actionable text analyzer 308.

The actionable text analyzer 308 may then also do additional text processing to determine if the negative content can be acted upon. There may be negative sentiment that does not have any kind of actionable content or does not provide an agent the ability to respond. For example, a sentence such as "Delta sucks" cannot have an actionable response. There is no information within the content that allows the organization to change behavior or address some organizational performance to address the negative content. However, if the text says, "Delta sucks because they can't move people through the checkout line quickly", this sentence may be actionable as the content includes a specific item of distaste or dissatisfaction with the user. In this case, the user is upset about the checkout lines, which may be addressed by the organization.

The actionable text analyzer 308 can also receive text processing algorithms from the text processing rules database 230. The actionable text analyzer 308 can employ any type of text processing or language analysis to determine which of the negative content is actionable. For example, the actionable text analyzer 308 may review content for the objects of sentences. While the subject and verb may contain the negative connotation, the object of the sentence may include any type of actionable information. Thus, the actionable text analyzer 308 can conduct an object analysis of the content to determine which content is actionable. Any actionable text or content may be passed, by the actionable text analyzer 308, to the parser 312.

The parser 312 may extract, indicate, and/or highlight each portion of the message 304 having actionable text. Thus, the parser 312 parses the actionable content. By parsing the content, the actionable text is identified for the agent for further organization or analysis by the sorter/orderer 316.

To better route the message, the sorter/orderer 316 can sort and/or order the actionable content. Here, the sorter/orderer 316 may evaluate the actionable content, identified by the parser 312, for the degree of the negative sentiment, any degree of actionable information in each of the parsed items of content, any temporal information within the parsed content, and/or any intent within the parsed content. There may be other or further evaluations by the sorter/orderer 316. Based on the information about the actionable content, the sorter/orderer 316 can sort or order these actionable content items from most important to least important. Based on this order, the highest ranked actionable content may then be used to route the message to an agent. The sort of the actionable content and the message 304 can then be sent as a message for agent action 320 to the agent interface 224 that may send the analyzed message onto an agent 228. Thus, the text processing component 214 can receive two or more social media messages to identify the long social media messages 304, evaluate that long media message for negative sentiment, determine the actionable information within that negative sentiment, parse, sort, and order that information for sending to an agent.

Figure 4:
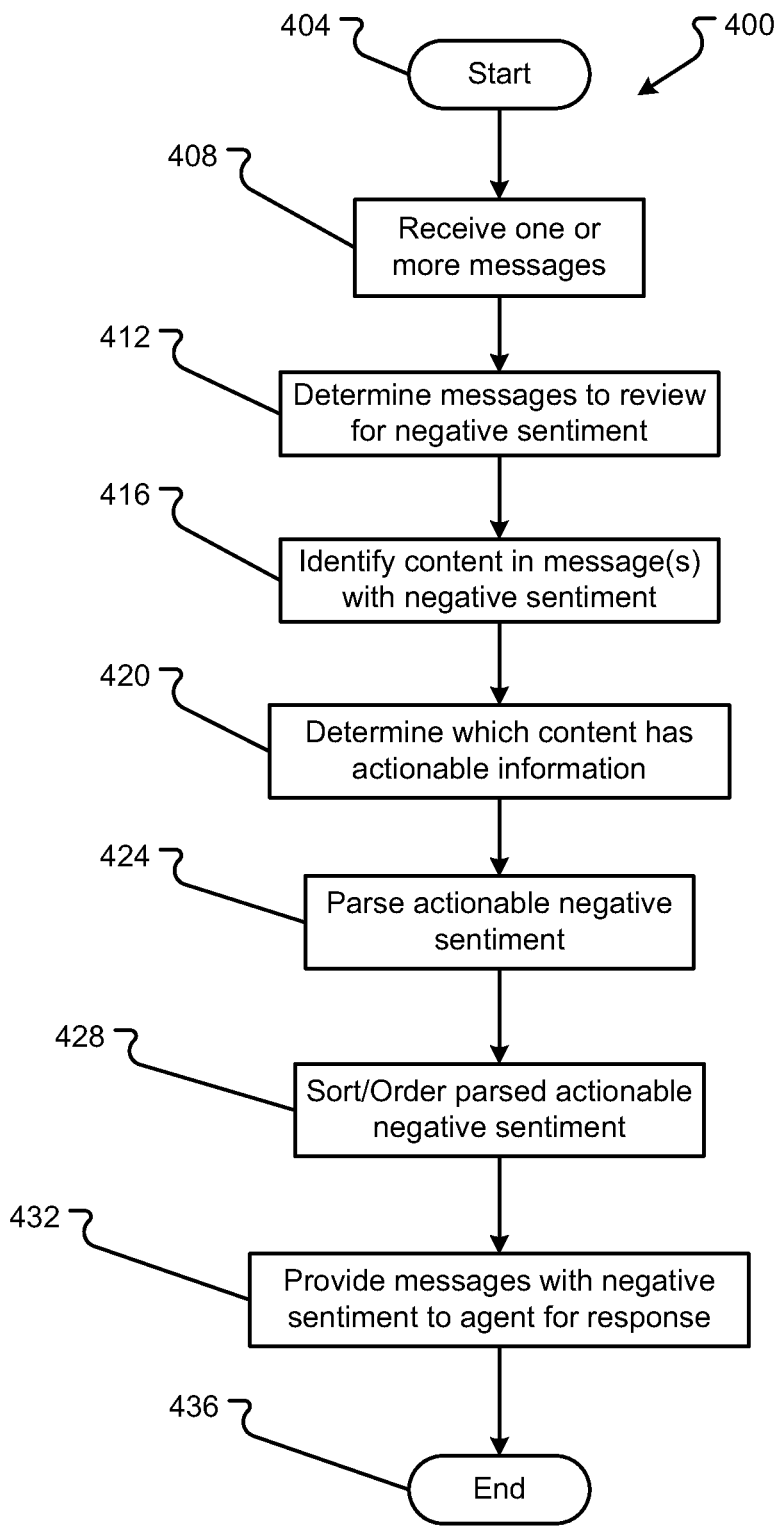
FIG. 4 is a flow diagram of an embodiment a process for routing long social media messages to an agent based on actionable, negative sentiment.

An embodiment of a method 400 for identifying negative actionable sentiment in a long social media message is shown in FIG. 4. While a general order for the steps of the method 400 is shown in FIG. 4, any number of steps, either fewer or more steps, can be used in the method 400, and the steps may be arranged in any order. Generally, the method 400 starts with a start operation 404 and ends with an end operation 436. The method 400 can include more or fewer steps or can arrange the order of the steps differently than those shown in FIG. 4. The method 400 can be executed as a set of computer-executable instructions, executed by a computer system, and encoded or stored on a computer readable medium. Further, the method 400 can be executed by a gate or other hardware device or component in an Application Specific Integrated Circuit, a Field Programmable Gate Array, or other type of hardware device. Hereinafter, the method 400 shall be explained with reference to the systems, components, modules, software, data structures, user interfaces, etc. described herein.

The social media gateway 156 may receive one or more social media messages, in step 408. Here, the social media gateway 156 may pull a social media message from a social media network 140, 144, 148. In other situations, the social media gateway 156 may have a message pushed to the social media gateway 156. For example, if the social media gateway 156 is subscribed to a social media network 140 and a new message is posted on a subscribed area of the network 140, the social media gateway 156 may receive that message automatically through network 112. The social media messages may then be sent from the social media gateway to the dialog system 160 in contact server 116. It should also be noted that long messages received directly from a user device 108 may also be forwarded to the dialog system 160 in contact server 116.

The messages are received by the dialog core 210 of the dialog system 160 described in conjunction with FIG. 2B. These messages 304 may then be sent to the text processing component 214 from the dialog core 210 to determine which of the media messages 304 should be reviewed for negative sentiment. A negative sentiment analyzer 308, of the text processing component 214, can receive the messages 304. The text negative sentiment analyzer 308 may then determine which messages to review for negative sentiment, in step 412. Here, some messages may have a longer duration or have more content than other messages. For example, any message with more than four sentences may be deemed to be a long social media message. The negative sentiment analyzer 308 may then pare the group of messages 304 to review only long social media messages. In this way, the negative sentiment analyzer 308 insures that the text processing component 214 provides the greatest amount of value by evaluating only those messages which would be more difficult for agents to review and address.

After determining which of the messages 304 to analyze, the negative sentiment analyzer 308 may then extract text processing rules or algorithms from the text processing rules database 230 to further analyze the messages 304 for negative sentiment or negative comment, in step 416. In this step, the negative sentiment analyzer 308 may use one or more text processing techniques or one or more language processing techniques to determine negative sentiment or areas of negative sentiment within the long social message 304. Negative sentiment can be any sentence that includes any negative text or negative language. For example, negative sentiment may include certain words, words such as, "sucks", "fail", "poor", etc., certain punctuation, certain emoticons, or combinations thereof. Sentences or areas within the long social media messages 304 containing such words may be flagged for further review by actionable text analyzer 308.

In an example, a transcript of a chat session may be included with comments from a customer associated with the chat. The chat logs have a structure that is formatted like: <timestamp>[username]<text>, where the "username" alternates between the agent and the customer. The negative sentiment analyzer 308 can recognize the chat and summarize the chat as a "chat log." The negative sentiment analyzer 308 may also decompose the chat to identify the issue presented in the dialog and either validate that the issue in the dialog is the same issue that the customer is complaining about or if it is a different issue. For example, in some cases, the reason for including the chat log is to point out rude behavior on the part of the agent that was in the chat, and thus, the subject of the chat is not necessarily interesting. This situation might be indicated by the customer text outside of the chat log complaining of agent behavior. In other cases, the customer comments may state that the solution offered in the chat did not solve the problem. Thus, with the chat logs, the negative sentiment analyzer 308 can determine if the content of the chat log matched the object of the negative sentiment in the text outside of the chat log. Such a determination would help the agent know if they are looking at the chat log to see what technical solution was offered by the chat agent or if they are looking at the language the chat agent was using in offering a technical solution.

In another example, customers of internet service providers sometimes include technical data, such as "ping logs" (output of the "ping" comment), to demonstrate either dropped packets or "lag" in the form of long ping response times. Or, the customer might include a URL or direct JPEG of a speed test showing slow data transfer performance. In these cases, the negative sentiment analyzer 308 may visually label the block of text (ping log) or speed test URL/ JPEG. For example, a customer may provide ping logs taken at different times of the day to point out the inconsistency of network throughput from their point of view. For situations that include technical data, the act of including the text/ URL/JPEG can be an indication of negative sentiment in these contexts. When the technical data is embedded in long text messages, the inclusion of the technical data can indicate negative sentiment related to surrounding text, and the negative sentiment analyzer 308 may summarize the technical data where possible. In certain cases, like the ping log, it would be possible to summarize the average ping and packet loss information in a more human digestible format for the agent, possibly with some visual indication where the ping times or packet loss exceeds some normative threshold that the company has set for acceptable network performance.

The actionable text analyzer 308 may then determine which of the flagged content received by the negative sentiment analyzer 308 has actionable information, in step 420. The actionable information is information that goes beyond a simple sentient having a negative sentiment but includes a specific problem or area to be addressed by the organization. This actionable information may be determined by one or more text processing techniques or one or more language processing techniques. The actionable text analyzer 308 may then extract text processing and language processing algorithms from the text processing rules database 230 to review the flagged negative sentiment. One such type of analysis may be object analysis as described hereinbefore. The actionable text analyzer 308 may then pair out any negative sentiment that has no actionable information and pass only the actionable negative sentiment flagged content to a parser 312.

The parser 312 may then parse actionable negative sentiment, in step 424. Here, the parser 312 can extract the actionable negative sentiment from the message for further processing. However, the message will be preserved with the flagged information intact. The flagged information may be highlighted or may be provided with some type of indicia that allows the agent to view the information quickly within the long social media message. Thus, the parser 312 may highlight any sentence with any actionable negative sentiment or may create one or more other types of visual, audio, or other types of indicia for the agent to locate the content with negative sentiment. The long social media message and the parsed actionable negative sentiment may then be passed to the sorter/orderer 316.

The sorter/orderer 316 may then sort the parsed actionable negative sentiment content from highest ranked to lowest ranked, in step 428. The sorting and ordering of the actionable sentiment may be completed by evaluation of the content within each of the parsed actionable negative sentiment in the sentences or content. For example, the sorter/orderer 316 may determine a degree of negative sentiment, the information density in each of the actionable negative sentiments, any temporal information within any of that actionable negative sentiment, or intent therein. The degree of negative sentiment may be evaluated by the number of negative words within a single item of content. The information density may be an evaluation of the length of the actionable negative sentiment, the amount of objects or information that may be addressed within one item of actionable negative sentiment, or other information that creates a sentence having a great amount of information. The temporal information can include any type of date or time that may be associated with the actionable negative sentiment that may be used to determine which issue is a more recent problem. Intent can be information within the sentence that provides for an evaluation of the intent of the user to have something done by the organization.

The sorter/orderer 316 may then use this evaluation to rank the actionable negative sentiment from highest ranked to lowest ranked. This information, along with the long social media message, may then be provided as a message for agent action to the agent router or agent interface 224. The agent interface 224 may then use the sorted and ranked actionable negative sentiment to determine a routing decision for an agent. Once a routing decision is determined, the agent interface 224 passes the long social media message with the flagged actionable negative sentiment to an agent, in step 432.

The system and methods described herein have specific advantages for allowing for more efficient processing of user complaints. Users may provide complaints and long ranting dialogs or monologues in social media. These messages tend to be very difficult for a contact center to process. Using the system and methods described herein, those long messages may be evaluated for negative sentiment. Further, once the negative sentiment is determined, the system can determine if the messages are actionable. In this way, the contact center only evaluates or responds to long social media messages that have actionable negative sentiment that the organization can address. This type of processing allows the contact center to be more efficient by ignoring long social media messages that are simply users or consumers venting without being able to do anything about that type of feeling or injury.

FIG. 5 illustrates a block diagram of a computing environment 500 that may function as servers, computers, or other systems provided herein. The environment 500 includes one or more user computers 505, 510, and 515. The user computers 505, 510, and 515 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 505, 510, 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network 520 and/or displaying and navigating web pages or other types of electronic documents. Although the exemplary computer environment 500 is shown with three user computers, any number of user computers may be supported.

Environment 500 further includes a network 520. The network 520 may can be any type of network familiar to those skilled in the art that can support data communications using any of a variety of commercially-available protocols, including without limitation SIP, TCP/IP, SNA, IPX, AppleTalk, and the like. Merely by way of example, the network 520 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 525, 530. In this example, server 525 is shown as a web server and server 530 is shown as an application server. The web server 525, which may be used to process requests for web pages or other electronic documents from user computers 505, 510, and 515. The web server 525 can be running an operating system including any of those discussed above, as well as any commercially-available server operating systems. The web server 525 can also run a variety of server applications, including SIP servers, HTTP servers, FTP servers, CGI servers, database servers, Java servers, and the like. In some instances, the web server 525 may publish operations available operations as one or more web services.

The environment 500 may also include one or more file and or/application servers 530, which can, in addition to an operating system, include one or more applications accessible by a client running on one or more of the user computers 505, 510, 515. The server(s) 530 and/or 525 may be one or more general purpose computers capable of executing programs or scripts in response to the user computers 505, 510 and 515. As one example, the server 530, 525 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 530 may also include database servers, including without limitation those commercially available from Oracle, Microsoft, Sybase™, IBM™ and the like, which can process requests from database clients running on a user computer 505.

The web pages created by the server 525 and/or 530 may be forwarded to a user computer 505 via a web (file) server 525, 530. Similarly, the web server 525 may be able to receive web page requests, web services invocations, and/or input data from a user computer 505 and can forward the web page requests and/or input data to the web (application) server 530. In further embodiments, the web server 530 may function as a file server. Although for ease of description, FIG. 6 illustrates a separate web server 525 and file/application server 530, those skilled in the art will recognize that the functions described with respect to servers 525, 530 may be performed by a single server and/or a plurality of specialized servers, depending on implementation-specific needs and parameters. The computer systems 505, 510, and 515, web (file) server 525 and/or web (application) server 530 may function as the system, devices, or components described in FIGS. 1-4.

The environment 500 may also include a database 535. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. The database 535 may reside in a storage-area network ("SAN") familiar to those skilled in the art. Similarly, any necessary files for performing the functions attributed to the computers 505, 510, 515, 525, 530 may be stored locally on the respective computer and/or remotely, as appropriate. The database 535 may be a relational database, such as Oracle 10i™, that is adapted to store, update, and retrieve data in response to SQL-formatted commands.

FIG. 6 illustrates one embodiment of a computer system 600 upon which the servers, computers, or other systems or components described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage devices 620. By way of example, storage device(s) 620 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. The computer system 600 may also include a processing acceleration unit 635, which can include a DSP, a special-purpose processor, and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 820 (FIG. 8) and/or any other computer described above with respect to the computer system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the Fig. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A computer-implemented method for determining an agent routing in a contact center, the method comprising executing on a processor the steps of:
   obtaining, by the processor, a group of two or more electronic communication messages from two or more social media networks in a computer with a memory;
   filtering, by the processor, the group of the two or more electronic communication messages to determine a second group of two or more messages, wherein the messages in the second group of two or more messages contain similar content;
   aggregating, by the processor, the second group of two or more messages into a packet of messages;
   receiving, by the processor, the packet of messages;
   identifying content in the packet of messages with negative sentiment;
   determining whether the identified content is actionable; and
   if the identified content is negative and actionable, providing the packet of messages to an agent for response.

2. The method as defined in claim 1, wherein at least one message in the second group of two or more messages includes two or more sentences, concepts, questions, statements, postings, segments, and/or interactions.

3. The method as defined in claim 2, further comprising:
   determining to review a long message from the second group of two or more social media messages.

4. The method as defined in claim 3, wherein negative sentiment is determined by one or more text processing techniques.

5. The method as defined in claim 4, wherein actionable content is determined by one or more language processing techniques.

6. The method as defined in claim 5, wherein one of the language processing techniques is object-focused analysis.

7. The method as defined in claim 5, further comprising parsing the actionable content.

8. The method as defined in claim 7, further comprising at least one of:
   sorting the parsed actionable content; or
   ordering the parsed actionable content.

9. The method as defined in claim 8, wherein the actionable content is sorted or ordered based on one or more of a degree of negative sentiment, an information density, temporal information, or intent.

10. The method as defined in claim 6, further comprising, based on a highest-ranked actionable content in the sort or the order, providing the packet of messages to the agent.

11. A non-transitory computer readable medium having stored thereon processor executable instructions that cause a computing system to execute a computer-implemented method for generating an agent routing, the instructions comprising:
    instructions to obtain a group of two or more social media messages from two or more social media networks;
    instructions to filter the group of the two or more social media messages to determine a second group of two or more messages, wherein the messages in the second group of two or more messages contain similar content;
    instructions to aggregate the second group of two or more messages into a packet of messages;
    instructions to receive the packet of messages;
    instructions to identify content in the packet of messages with negative sentiment;
    instructions to determine whether the identified negative content is actionable;
    instructions to parse the negative actionable content;
    instructions to sort the parsed actionable content;
    instructions to order the sorted actionable content; and
    based on the order, instructions to provide the packet of messages to an agent for response.

12. The computer readable medium as defined in claim 11, further comprising:
    instructions to discard a second message not determined to be a long message.

13. The computer readable medium as defined in claim 12, wherein negative sentiment is determined by one or more text processing techniques, and wherein actionable content is determined by one or more language processing techniques.

14. The computer readable medium as defined in claim 13, wherein the actionable content is sorted or ordered based on one or more of a degree of negative sentiment, an information density, temporal information, or intent.

15. The computer readable medium as defined in claim 14, wherein a routing decision to an agent is based on a highest-ranked actionable content in the order.

16. A communication system comprising:
    a social media gateway, in communication with two or more social media networks over a communications network, wherein the social media gateway obtains a group of two or more social media messages from the two or more social media networks;
    a dialog system in communication with the social media gateway, wherein the dialog system:
        filters the group of the two or more social media messages to determine a second group of two or more messages, wherein the messages in the second group of two or more messages contain similar content;
        aggregates the second group of two or more messages into a packet of messages;
        determines an agent routing for the packet of messages;
        wherein the dialog system comprises:
            a text processing component that receives and analyzes the packet of messages, wherein the text processing component comprises:
                a negative sentiment analyzer that identifies content in the packet of messages with negative sentiment;
                an actionable text analyzer in communication with the negative sentiment analyzer, wherein the actionable text analyzer determines whether the identified negative content is actionable;

a parser in communication with the actionable text analyzer, wherein the parser parses the actionable content;

a sorter/order in communication with the parser, wherein the sorter/order one or more of sorts or orders the actionable content; and wherein, based on at least one of the sort or the order, the text processing component provides the packet of messages to an agent interface to route the long message to an agent for a response.

17. The communication system as defined in claim 16, wherein the text processing component discards a second message not determined to be a long message.

18. The communication system as defined in claim 17, wherein negative sentiment is determined by one or more text processing techniques, wherein actionable content is determined by one or more language processing techniques.

19. The communication system as defined in claim 18, wherein the actionable content is sorted or ordered based on one or more of a degree of negative sentiment, an information density, temporal information, or intent.

20. The communication system as defined in claim 16, wherein a routing decision to the agent is based on a highest-ranked actionable content in the order.

* * * * *